US012735079B2

(12) United States Patent
Kang

(10) Patent No.: US 12,735,079 B2
(45) Date of Patent: Sep. 15, 2026

(54) APPARATUS AND METHOD FOR CONTROLLING AUTONOMOUS DRIVING

(71) Applicants: HYUNDAI MOTOR COMPANY, Seoul (KR); KIA CORPORATION, Seoul (KR)

(72) Inventor: Dong Hoon Kang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 218 days.

(21) Appl. No.: 18/387,363

(22) Filed: Nov. 6, 2023

(65) Prior Publication Data

US 2025/0050917 A1 Feb. 13, 2025

(30) Foreign Application Priority Data

Aug. 10, 2023 (KR) ........................ 10-2023-0104996

(51) Int. Cl.
*G08G 1/16* (2006.01)
*B60W 60/00* (2020.01)

(52) U.S. Cl.
CPC ........... *B60W 60/007* (2020.02); *G08G 1/166* (2013.01); *B60W 2540/00* (2013.01); *B60W 2554/4041* (2020.02); *B60W 2554/802* (2020.02); *B60W 2554/804* (2020.02); *B60W 2720/106* (2013.01)

(58) Field of Classification Search
CPC ........... B60W 60/007; B60W 2540/00; B60W 2554/4041; B60W 2554/802; B60W 2554/804; B60W 2720/106; B60W 2520/10; B60W 2540/225; B60W 30/16; B60W 2554/4042; B60W 60/0015; B60W 30/0953; B60W 30/0956; B60W 40/10; B60W 60/0016; B60W 30/18109; B60W 40/04; B60W 40/08; B60W 2040/0818; B60W 2050/0004; B60W 2710/18; G08G 1/166
See application file for complete search history.

(56) References Cited

U.S. PATENT DOCUMENTS

2008/0174451 A1* 7/2008 Harrington ............ G08B 21/06 340/905
2018/0148045 A1* 5/2018 Lee ....................... B60W 30/00
2019/0126917 A1* 5/2019 You .................... B62D 15/0265
(Continued)

*Primary Examiner* — Ashley L Redhead, Jr.
(74) *Attorney, Agent, or Firm* — Lempia Summerfield Katz LLC

(57) ABSTRACT

An apparatus and method for controlling autonomous driving of a host vehicle are disclosed. The apparatus identifies other vehicle driving information including at least one of a relative speed between the host vehicle and a front vehicle, a relative distance between the host vehicle and the front vehicle, an acceleration of the front vehicle, an average deceleration amount of a rear vehicle of the host vehicle, an instantaneous maximum deceleration amount of the rear vehicle, and/or a deceleration timing of the rear vehicle by using a sensor device. The apparatus also identifies unresponsive state duration of a user within the host vehicle. When the unresponsive state duration is greater than or equal to a specified time duration, the apparatus performs emergency stop control on the host vehicle by using at least a part of the other vehicle driving information.

19 Claims, 6 Drawing Sheets

(56) References Cited

U.S. PATENT DOCUMENTS

| | | | | |
|---|---|---|---|---|
| 2020/0339157 | A1* | 10/2020 | Yurdana | B60K 35/22 |
| 2021/0290134 | A1* | 9/2021 | Talamonti | A61B 5/37 |
| 2021/0300306 | A1* | 9/2021 | Costin | B60T 7/22 |
| 2024/0208468 | A1* | 6/2024 | Gomez | B60W 50/10 |
| 2024/0208522 | A1* | 6/2024 | Verma | B60W 40/09 |
| 2024/0308501 | A1* | 9/2024 | Qureshi | B60W 50/14 |

* cited by examiner

APPARATUS AND METHOD FOR CONTROLLING AUTONOMOUS DRIVING

CROSS-REFERENCE TO RELATED APPLICATION

This application claims the benefit of and priority to Korean Patent Application No. 10-2023-0104996, filed in the Korean Intellectual Property Office on Aug. 10, 2023, the entire contents of which are incorporated herein by reference.

TECHNICAL FIELD

The present disclosure relates generally to an autonomous driving control apparatus and a method thereof, and more particularly, relates to a technology that performs an emergency stop function when a user's unresponsive state continues.

BACKGROUND

As autonomous driving vehicles are becoming more popular, various technologies related to autonomous driving have been developed. Autonomous driving may be classified into partially autonomous driving, conditionally autonomous driving, highly autonomous driving, and/or fully autonomous driving depending on a control level.

Generally, among autonomous driving control functions, various types of control algorithms (or functions) are being developed for driving control of a host vehicle.

For example, when a user's unresponsive state continues for a specific time or more, an autonomous driving control apparatus may perform deceleration control on the host vehicle to prevent hazardous situations.

The user's unresponsive state may include, for example, a hands-off state of the host vehicle and/or a state regarding a direction in which the user faces when the host vehicle is controlled based on an in-cabin-camera (ICC). The ICC may include at least one interior camera positioned in at least one area of the interior of the host vehicle, for example.

When performing deceleration control (e.g., emergency stop control) on the host vehicle based on the unresponsive state duration of the user, the autonomous driving control apparatus may calculate (or identify) the deceleration for deceleration control by using information about a driving situation of a vehicle in front of the host vehicle.

However, when the deceleration control is performed while the host vehicle is driving, there is a possibility of collision with another vehicle driving behind or on a side of the host vehicle as well as the front vehicle. Accordingly, a dangerous situation may occur when only the driving information of the front vehicle is used.

SUMMARY

The present disclosure has been made to solve the above-mentioned problems occurring in the prior art while advantages achieved by the prior art are maintained intact.

Aspects of the present disclosure provide an autonomous driving control apparatus and method that may identify other vehicle driving information, including information about a driving situation of a vehicle in front of a host vehicle (sometimes also referred to herein as "front vehicle") and/or a vehicle behind the host vehicle (sometimes also referred to herein as "rear vehicle") by using a sensor device and may perform emergency stop control on the host vehicle based on at least a part of the other vehicle driving information.

Aspects of the present disclosure provide an autonomous driving control apparatus and method that may identify the unresponsive state duration of a user in the host vehicle. The autonomous driving control apparatus and method may perform emergency stop control by using the other vehicle driving information when it is determined that the duration of the unresponsive state is greater than or equal to a predetermined threshold time.

Aspects of the present disclosure provide an autonomous driving control apparatus and method that may identify reliability of driving information of the rear vehicle and may perform emergency stop control by using the corresponding information when it is determined that the reliability is greater than or equal to a specified value.

Aspects of the present disclosure provide an autonomous driving control apparatus and method that may identify decelerations having different values through emergency stop control with different algorithms based on whether there are a front vehicle and a rear vehicle of the host vehicle. The autonomous driving control apparatus and method may perform deceleration control on the host vehicle based on the identified decelerations.

Aspects of the present disclosure provide an autonomous driving control apparatus and method that may perform emergency stop control by further using driving information from not only the front vehicle and the rear vehicle, but also a side vehicle (e.g., a vehicle cutting into a driving lane from a left and/or right lane of the driving lane of the host vehicle).

Aspects of the present disclosure provide an autonomous driving control apparatus and method that may perform emergency stop control by further using information about a vehicle model of the front vehicle and/or the rear vehicle.

The technical problems to be solved by the present disclosure are not limited to the aforementioned problems. Rather, other technical problems not mentioned herein should be more clearly understood from the following description by those having ordinary skill in the art to which the present disclosure pertains.

According to an aspect of the present disclosure, an apparatus for autonomous driving control of a host vehicle is disclosed. The apparatus includes a sensor device and a memory that stores instructions. The apparatus also includes a controller operatively connected to the sensor device and the memory. The instructions, when executed by the controller, may cause the controller to identify other vehicle driving information including at least one of a relative speed between the host vehicle and a front vehicle, a relative distance between the host vehicle and the front vehicle, an acceleration of the front vehicle, an average deceleration amount of a rear vehicle of the host vehicle, an instantaneous maximum deceleration amount of the rear vehicle, a deceleration timing of the rear vehicle, or a combination of thereof by using the sensor device. The front vehicle may be a vehicle driving in front of the host vehicle and the rear vehicle may be a vehicle driving behind the host vehicle. The instructions, when executed by the controller, may further cause the controller to identify unresponsive state duration of a user within the host vehicle. The instructions, when executed by the controller, may further still cause the controller to, when the unresponsive state duration is greater than or equal to a specified time duration, perform emergency stop control on the host vehicle by using at least a part of the other vehicle driving information.

According to an embodiment, the instructions, when executed by the controller, may cause the controller to identify front vehicle driving information including at least one of the relative speed between the host vehicle and the front vehicle, the relative distance between the host vehicle and the front vehicle, the acceleration of the front vehicle, or a combination The instructions, when executed by the controller, may further cause the controller to identify rear vehicle driving information including at least one of the average deceleration amount of the rear vehicle, the instantaneous maximum deceleration amount of the rear vehicle, the deceleration timing of the rear vehicle, or a combination thereof. The instructions, when executed by the controller, may further still cause the controller to, when the unresponsive state duration is greater than or equal to the specified time duration, perform the emergency stop control by using the front vehicle driving information and the rear vehicle driving information.

According to an embodiment, the instructions, when executed by the controller, may cause the controller to identify first identification information corresponding to the rear vehicle. The instructions, when executed by the controller, may further cause the controller to, in response to identifying that the first identification information is changed to second identification information corresponding to another vehicle different from the rear vehicle, apply aging to reliability of the rear vehicle driving information obtained until a point in time when the first identification information is changed. The instructions, when executed by the controller, may further cause the controller to, when the first identification information is identified again before the reliability is reduced based on the aging such that the reliability is smaller than or equal to a specified value, perform the emergency stop control by using the rear vehicle driving information obtained until the point in time.

According to an embodiment, the instructions, when executed by the controller, may cause the controller to identify first identification information corresponding to the rear vehicle. The instructions, when executed by the controller, may further cause the controller to, in response to identifying that the first identification information is changed to second identification information corresponding to another vehicle different from the rear vehicle, apply aging to reliability of the rear vehicle driving information obtained until a point in time when the first identification information is changed. The instructions, when executed by the controller, may further still cause the controller to, when the first identification information is identified again after the reliability is reduced based on the aging such that the reliability is smaller than or equal to a specified value, identify further information about the rear vehicle, the further information having a specified amount determined based on a level of reliability. The instructions, when executed by the controller, may further yet cause the controller to perform the emergency stop control by using the information when information satisfies a specified condition.

According to an embodiment, the instructions, when executed by the controller, may cause the controller to perform the emergency stop control on the host vehicle when one or both of i) a hands-off state of the host vehicle is identified for a first time duration or longer or ii) a direction in which the user is facing, as identified by using the sensor device, is not included in a specified direction for a second time or longer while the host vehicle is controlled based on an in-cabin-camera (ICC).

According to an embodiment, the instructions, when executed by the controller, may cause the controller to, when it is identified that both the front vehicle and the rear vehicle are not present, perform the emergency stop control on the host vehicle based on a predetermined basic deceleration. The instructions, when executed by the controller, may further cause the controller to, while performing the emergency stop control, control driving of the host vehicle by repeatedly and periodically using a first jerk deceleration having a value that is greater than the basic deceleration.

According to an embodiment, the instructions, when executed by the controller, may cause the controller to, when it is identified that the front vehicle is present and the rear vehicle is not present, identify a first required deceleration for the emergency stop control by using at least one of the relative speed between the host vehicle and the front vehicle, the relative distance between the host vehicle and the front vehicle, the acceleration of the front vehicle, or a combination thereof. The instructions, when executed by the controller, may further cause the controller to perform the emergency stop control on the host vehicle based on a smaller value of a predetermined basic deceleration and the first required deceleration. The instructions, when executed by the controller, may further still cause the controller to, while performing the emergency stop control, control driving of the host vehicle by repeatedly and periodically using a second jerk deceleration having a value that is greater than the smaller value.

According to an embodiment, the instructions, when executed by the controller, may cause the autonomous driving control apparatus to, when it is identified that the front vehicle is not present and the rear vehicle is present, identify an average deceleration of the rear vehicle and an instantaneous maximum deceleration of the rear vehicle by using at least one of the average deceleration amount of the rear vehicle, the instantaneous maximum deceleration amount of the rear vehicle, the deceleration timing of the rear vehicle, or a combination thereof. The instructions, when executed by the controller, may further cause the controller to perform the emergency stop control on the host vehicle based on a second required deceleration having a value smaller than the average deceleration. The instructions, when executed by the controller, may further still cause the controller to, while performing the emergency stop control, control driving of the host vehicle by repeatedly and periodically using a third jerk deceleration having a value that is less than the instantaneous maximum deceleration and greater than the second required deceleration.

According to an embodiment, the instructions, when executed by the controller, may cause the controller to, when both the front vehicle and the rear vehicle are identified, identify a first required deceleration for the emergency stop control by using at least one of the relative speed between the host vehicle and the front vehicle, the relative distance between the host vehicle and the front vehicle, the acceleration of the front vehicle, or a combination thereof. The instructions, when executed by the controller, may further cause the controller to identify an average deceleration of the rear vehicle and an instantaneous maximum deceleration of the rear vehicle by using at least one of the average deceleration amount of the rear vehicle, the instantaneous maximum deceleration amount of the rear vehicle, the deceleration timing of the rear vehicle, or a combination thereof. The instructions, when executed by the controller, may further still cause the controller to perform the emergency stop control on the host vehicle based on a second required deceleration having a value smaller than the average deceleration. The instructions, when executed by the controller, may further yet cause the controller to, while performing the emergency stop control, control driving of the host vehicle by repeatedly and periodically using a third jerk deceleration having a value that is less than the instantaneous maximum deceleration and greater than the second required deceleration.

According to an embodiment, the instructions, when executed by the controller, may cause the controller to identify a first required deceleration for the emergency stop control by using at least one of the relative speed between the host vehicle and the front vehicle, the relative distance between the host vehicle and the front vehicle, the acceleration of the front vehicle, or a combination of the relative speed, the relative distance, and the acceleration, when both the front vehicle and the rear vehicle are identified. The instructions, when executed by the controller, may further cause the controller to perform the emergency stop control on the host vehicle based on a predetermined basic deceleration when the first required deceleration is greater than the predetermined basic deceleration and less than an average deceleration of the rear target. The instructions, when executed by the controller, may further still cause the controller to, while performing the emergency stop control, control driving of the host vehicle by repeatedly and periodically using a fourth jerk deceleration having a value that is less than an instantaneous maximum deceleration of the rear vehicle and greater than the basic deceleration.

According to an embodiment, the instructions, when executed by the controller, may cause the controller to, when both the front vehicle and the rear vehicle are identified, identify a first required deceleration for the emergency stop control by using at least one of the relative speed between the host vehicle and the front vehicle, the relative distance between the host vehicle and the front vehicle, the acceleration of the front vehicle, or a combination of the relative speed, the relative distance, the acceleration, or a combination thereof. The instructions, when executed by the controller, may further cause the controller to, when the first required deceleration is greater a than predetermined basic deceleration and an instantaneous maximum deceleration of the rear vehicle, identify a control time based on at least one of the relative distance between the host vehicle and the front vehicle, the relative speed between the host vehicle and the rear vehicle, a relative distance between the host vehicle and the rear vehicle, or a combination thereof. The instructions, when executed by the controller, may further still cause the controller to perform the emergency stop control during the control time based on the instantaneous maximum deceleration of the rear vehicle.

According to an embodiment, the instructions, when executed by the controller, may cause the controller to identify a fifth jerk deceleration based on the relative distance between the host vehicle and the front vehicle and the instantaneous maximum deceleration, while performing the emergency stop control. The instructions, when executed by the controller, may further still cause the controller to control driving of the host vehicle by repeatedly and periodically using the fifth jerk deceleration during the control time.

According to an embodiment, the instructions, when executed by the controller, may cause the controller to, in response to identifying the at least one other vehicle cutting into a driving lane of the host vehicle from at least one of a left lane that is to the left of the driving lane of the host vehicle, a right lane that is in the right of the driving lane of the host vehicle, or a combination thereof, perform the emergency stop control on the host vehicle by using at least one of an average deceleration amount of at least one other vehicle, an instantaneous maximum deceleration of the at least one other vehicle, a deceleration reaction speed of the at least one other vehicle, or a combination thereof.

According to an embodiment, the instructions, when executed by the controller, may cause the controller to further identify vehicle model information of each of the front vehicle and the rear vehicle by using the sensor device. The instructions, when executed by the controller, may further still cause the controller to perform the emergency stop control on the host vehicle based on a deceleration identified by further using the vehicle model information.

According to an aspect of the present disclosure, a method for autonomous control of a host vehicle is provided. The method includes identifying, by a controller, other vehicle driving information including at least one of a relative speed between the host vehicle and a front vehicle, a relative distance between the host vehicle and the front vehicle, an acceleration of the front vehicle, an average deceleration amount of a rear vehicle of the host vehicle, an instantaneous maximum deceleration amount of the rear vehicle, a deceleration timing of the rear vehicle, or a combination thereof. The front vehicle may be a vehicle driving in front of the host vehicle and the rear vehicle may be a vehicle driving behind the host vehicle. The method also includes identifying, by the controller, unresponsive state duration of a user within the host vehicle. The method additionally includes, when the unresponsive state duration is greater than or equal to a specified time, performing, by the controller, emergency stop control on the host vehicle by using at least a part of the other vehicle driving information.

According to an embodiment, performing the emergency stop control on the host vehicle may include performing, by the controller, the emergency stop control on the host vehicle when one or both of i) a hands-off state of the host vehicle is identified for a first time duration or longer or ii) a direction in which the user is facing as identified by using the sensor device is not included in a specified direction for a second time or longer while the host vehicle is controlled based on an ICC.

According to an embodiment, the method may further include performing, by the controller, the emergency stop control on the host vehicle based on a predetermined basic deceleration. The method may additionally include controlling, by the controller, driving of the host vehicle by repeatedly and periodically using a first jerk deceleration having a value that is greater than the basic deceleration, while performing the emergency stop control.

According to an embodiment, the method may further include, when it is identified that the front vehicle is present and the rear vehicle is not present, identifying, by the controller, a first required deceleration for the emergency stop control by using at least one of the relative speed between the host vehicle and the front vehicle, the relative distance between the host vehicle and the front vehicle, the acceleration of the front vehicle, or a combination thereof. The method may additionally include performing, by the controller, the emergency stop control on the host vehicle based on a smaller value of a predetermined basic deceleration and the first required deceleration. The method may further include, while performing the emergency stop control, controlling, by the controller, driving of the host vehicle by repeatedly and periodically using a second jerk deceleration having a value that is greater than the smaller value.

According to an embodiment, the method may further include, when it is identified that the front vehicle is not present and the rear vehicle is present, identifying, by the controller, an average deceleration of the rear vehicle and an instantaneous maximum deceleration of the rear vehicle by using at least one of the average deceleration amount of the rear vehicle, the instantaneous maximum deceleration amount of the rear vehicle, the deceleration timing of the rear vehicle, or a combination thereof. The method may also include performing, by the controller, the emergency stop control on the host vehicle based on a second required deceleration having a value smaller than the average deceleration. The method may further include, while performing the emergency stop control, controlling, by the controller, driving of the host vehicle by repeatedly and periodically using a third jerk deceleration having a value that is less than the instantaneous maximum deceleration and greater than the second required deceleration.

According to an embodiment, the method may further include, when both the front vehicle and the rear vehicle are identified, identifying, by the controller, a first required deceleration for the emergency stop control by using at least one of the relative speed between the host vehicle and the front vehicle, the relative distance between the host vehicle and the front vehicle, the acceleration of the front vehicle, or a combination thereof. The method may further include, when a predetermined basic deceleration is greater than the first required deceleration, identifying, by the controller, an average deceleration of the rear vehicle and an instantaneous maximum deceleration of the rear vehicle by using at least one of the amount of rear vehicle, the average deceleration the instantaneous maximum deceleration amount of the rear vehicle, the deceleration timing of the rear vehicle, or a combination thereof. The method may further include performing, by the controller, the emergency stop control on the host vehicle based on a second required deceleration having a value smaller than the average deceleration. The method may additionally include, while performing the emergency stop control, controlling, by the controller, driving of the host vehicle by repeatedly and periodically using a third jerk deceleration having a value that is less than the instantaneous maximum deceleration and greater than the second required deceleration.

BRIEF DESCRIPTION OF THE DRAWINGS

The above and other objects, features, and advantages of the present disclosure should be more apparent from the following detailed description taken in conjunction with the accompanying drawings, in which.

Figure 1:
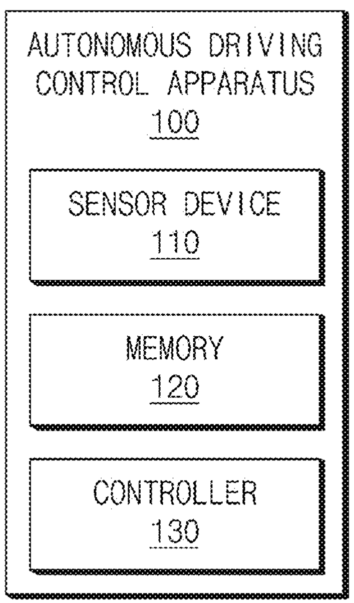
FIG. 1 is a block diagram showing components of an autonomous driving control apparatus, according to an embodiment of the present disclosure.

In the drawings, the same or similar components are marked by the same or similar reference signs.

DETAILED DESCRIPTION

Hereinafter, embodiments of the present disclosure are described in detail with reference to the accompanying drawings. In the accompanying drawings, identical or equivalent components are designated by the same reference numerals even where the components are displayed on different drawings. Furthermore, in the following description, detailed descriptions associated with well-known functions or configurations have been omitted where the subject matter of the present disclosure may have been unnecessarily obscured thereby.

In describing elements of an embodiment of the present disclosure, the terms first, second, A, B, (a), (b), and the like may be used herein. These terms are merely used to distinguish one element from another element. The terms do not limit the nature, order, or priority of the corresponding elements. Furthermore, unless otherwise defined, all terms including technical and scientific terms used herein should be interpreted as is customary in the art to which the present disclosure pertains. It should be understood that terms used herein should be interpreted as having a meaning that is consistent with their meaning in the context of the present disclosure and the relevant art. The terms should not be interpreted in an idealized or overly formal sense unless expressly so defined herein.

Hereinafter, various embodiments of the present disclosure are described in detail with reference to FIGS. 1-6. When a component, device, element, or the like of the present disclosure is described as having a purpose or performing an operation, function, or the like, the component, device, or element should be considered herein as being "configured to" meet that purpose or perform that operation or function.

FIG. 1 is a block diagram showing components of an autonomous driving control apparatus, according to an embodiment of the present disclosure.

According to an embodiment, an autonomous driving control apparatus 100 may include at least one of a sensor device 110 a memory 120, a controller 130, or any combination thereof. The configuration of the autonomous driving control apparatus 100 shown in FIG. 1 is an example, and embodiments of the present disclosure are not limited thereto. For example, the autonomous driving control apparatus 100 may further include components not shown in FIG. 1 (e.g., at least one of an interface device, a communication device, a display device, or any combination thereof).

According to an embodiment, the sensor device 110 may obtain (or identify) various pieces of information used for the driving of a host vehicle.

For example, the sensor device 110 may include at least one sensor including at least one of a camera, a radar, light detection and ranging (LiDAR), or any combination thereof.

The sensor device 110 may identify pieces of information (e.g., driving information of another vehicle) about the driving of at least one other vehicle that is driving adjacent to the host vehicle.

For example, the sensor device 110 may identify information about the driving of a front vehicle that is driving in front of the host vehicle. The sensor device 110 may identify front vehicle driving information including at least one of a relative speed between the host vehicle and the front vehicle, a relative distance between the host vehicle and the front vehicle, an acceleration of the front vehicle, or any combination thereof.

As another example, the sensor device 110 may identify information about the driving of a rear vehicle that is driving behind the host vehicle. For example, the sensor device 110 may identify at least one of an average deceleration amount of the rear vehicle, an instantaneous maximum deceleration amount of the rear vehicle, a deceleration timing of the rear vehicle, or any combination thereof. In an example, the controller 130 may identify rear vehicle driving information including at least one of the average deceleration of the rear vehicle, instantaneous maximum deceleration of the rear vehicle, or any combination thereof by using information about the rear vehicle identified by the sensor device 110.

As yet another example, the sensor device 110 may identify information about at least one other vehicle driving on a side lane (e.g., a left lane and/or a right lane relative to a driving lane on which the host vehicle is driving) positioned on the side of the host vehicle and then cuts into the driving lane on which the host vehicle is driving.

In an embodiment, the sensor device 110 may further identify vehicle model information of at least one other vehicle that is driving adjacent to the host vehicle. In an example, the controller 130 may identify a deceleration used to perform driving control (e.g., deceleration control) on the host vehicle by further using the vehicle model information.

For example, the sensor device 110 may obtain identification information of at least one other vehicle that is driving adjacent to the host vehicle. The identification information may include identification (ID) information corresponding to the at least one other vehicle. For example, in response to identifying that there is a rear vehicle, the sensor device 110 (or identify) first identification information corresponding to the rear vehicle. When the rear vehicle is driving on a different lane from the lane of the host vehicle, or when another vehicle different from the rear vehicle has entered between the host vehicle and the rear vehicle, the sensor device 110 may identify that the first identification information corresponding to the rear vehicle is changed to second identification information corresponding to the other vehicle.

The sensor device 110 may identify information about a state of at least one user in the host vehicle. For example, the sensor device 110 may identify a hands-off state (e.g., a state where the user does not grip a steering wheel) of the host vehicle. As another example, while the host vehicle is controlled based on a specified control method (e.g., ICC), the sensor device 110 may identify a direction in which the user faces. For example, the sensor device 110 may determine whether a direction in which the user faces is included in a specified direction (e.g., a direction within a specific angle relative to the front).

The sensor device 110 may obtain information by using at least one sensor or may identify the obtained information based on other external components (e.g., a communication device).

According to an embodiment, the memory 120 may store instructions or data. For example, the memory 120 may store one or more instructions that cause the autonomous driving control apparatus 100 to perform various operations when executed by the controller 130.

In an embodiment, the memory 120 and the controller 130 may be implemented as one chipset. The controller 130 may include at least one of a communication processor or a modem.

The memory 120 may store various pieces of information related to the autonomous driving control apparatus 100. For example, the memory 120 may store information about the operation history of the controller 130. As another example, the memory 120 may store information related to states and/or operations of components (e.g., at least one of an engine control unit (ECU), the sensor device 110, the controller 130, or any combination thereof) of the host vehicle.

According to an embodiment, the controller 130 may be operatively connected to the sensor device 110 and/or the memory 120. The controller 130 may control the operation of the sensor device 110 and/or the memory 120.

For example, the controller 130 may identify at least one of a relative speed between the host vehicle and the front vehicle, a relative distance between the host vehicle and the front vehicle, the acceleration of the front vehicle, or any combination thereof by using the sensor device 110.

As another example, the controller 130 may identify at least one of the average deceleration amount of the rear vehicle of the host vehicle, the instantaneous maximum deceleration amount of the rear vehicle, the deceleration timing of the rear vehicle, or any combination thereof by using the sensor device 110. For example, the controller 130 may identify at least one of the rear vehicle's average deceleration, instantaneous maximum deceleration, or any combination thereof by using at least a part of identified information about the rear vehicle.

In some examples, the controller 130 may identify other vehicle driving information including front vehicle driving information and/or rear vehicle driving information.

In an embodiment, the controller 130 may determine whether unresponsive state duration of the user in the host vehicle is greater than or equal to a specified time duration.

For example, when the hands-off state of the host vehicle is identified for a first time duration or longer, the controller 130 may identify that the user's unresponsive state duration is greater than or equal to the specified time duration.

As another example, when a direction in which the user faces and which is identified by using the sensor device 110 is not included in a specified direction for a second time period or longer while the controller 130 controls the host vehicle based on a specified component (e.g., ICC), the controller 130 may identify that the user's unresponsive state duration is greater than or equal to the specified time duration. The specified direction may include directions within a specified angle range based on the front direction of the host vehicle.

When the unresponsive state duration is greater than or equal to the specified time duration, the controller 130 may perform emergency stop control by using front vehicle driving information and rear vehicle driving information.

For example, the controller 130 may identify first identification information corresponding to the rear vehicle by using the sensor device 110. In response to identifying that the first identification information is changed to second identification information corresponding to another vehicle different from the rear vehicle (e.g., in response to identifying that the rear vehicle deviates, disappears from, or is no longer behind the host vehicle and another vehicle is driving behind the host vehicle), the controller 130 may apply aging to the reliability of the rear vehicle driving information obtained until a point in time when the first identification information is changed. The aging may comprise a data processing technique for reducing the reliability over time.

When the first identification information is identified again before the reliability is reduced based on the aging such that the reliability is smaller than or equal to a specified value (e.g., when it is determined that the rear vehicle is again driving behind the host vehicle), the controller 130 may perform emergency stop control by using the rear vehicle driving information obtained before the identified point in time.

On the other hand, when the first identification information is identified again after the reliability is reduced based on the aging such that the reliability is smaller than or equal to the specified value, the controller 130 may identify further information about the rear vehicle, the further information having a specified amount that is determined based on a level of reliability. For example, the controller 130 may further identify information about the rear vehicle in proportion to a rate at which the reliability is reduced depending on the aging. When the information thus further identified satisfies a specified condition (e.g., when the reliability of rear vehicle driving information calculated based on information thus further identified becomes 1), the controller 130 may perform emergency stop control by using the information thus further identified.

The controller 130 may identify a deceleration and/or jerk deceleration for emergency stop control on the host vehicle based on different methods depending on whether there is a front vehicle and/or rear vehicle of the host vehicle.

For example, when it is identified that the front vehicle and rear vehicle are not present, the controller 130 may perform emergency stop control on the host vehicle based on a predetermined basic deceleration. The predetermined basic deceleration may be, for example, a value set by a manufacturer when the host vehicle is manufactured or may be a setting value capable of being changed by an update after the host vehicle is manufactured. As another example, the predetermined basic deceleration may be a value identified through a predefined method (or an equation) to calculate the deceleration for emergency stop control based on the real-time driving speed of the host vehicle. While performing the emergency stop control, the controller 130 may control the driving of the host vehicle by repeatedly and periodically using a first jerk deceleration having a value that is greater than the basic deceleration. Due to control through the first jerk deceleration, a sense of heterogeneity may be provided to the user. The user may thus perceive that the emergency stop control is being performed through the sense of heterogeneity.

For example, when it is identified that the front vehicle is present and the rear vehicle is not present, the controller 130 may identify a first required deceleration for emergency stop control by using at least one of a relative speed between the host vehicle and the front vehicle, a relative distance between the host vehicle and the front vehicle, an acceleration of the front vehicle, or any combination thereof. For example, the first required deceleration may be the same value as the predetermined basic deceleration. For example, the controller 130 may perform emergency stop control on the host vehicle based on the smaller value of the predetermined basic deceleration and the first required deceleration. For example, while the controller 130 is performing the emergency stop control, the controller 130 may control the driving of the host vehicle by repeatedly and periodically using a second jerk deceleration having a value that is greater than the smaller value of the predetermined basic deceleration and the first required deceleration. Due to control through the second jerk deceleration, a sense of heterogeneity may be provided to the user, and the user may perceive that the emergency stop control is being performed through the sense of heterogeneity.

When it is identified that the front vehicle is not present and the rear vehicle is present, the controller 130 may identify the average deceleration and instantaneous maximum deceleration of the rear vehicle by using at least one of the rear vehicle's average deceleration amount, instantaneous maximum deceleration amount, deceleration timing, or any combination thereof. The controller 130 may perform emergency stop control on the host vehicle based on a second required deceleration having a value smaller than the average deceleration. While the controller 130 is performing the emergency stop control, the controller 130 may control the driving of the host vehicle by repeatedly and periodically using a third jerk deceleration having a value that is smaller than the instantaneous maximum deceleration and greater than the second required deceleration. Due to control through the third jerk deceleration, a sense of heterogeneity may be provided to the user. The user may thus perceive that the emergency stop control is being performed through the sense of heterogeneity.

When the front vehicle and the rear vehicle are identified, the controller 130 may identify the first required deceleration for emergency stop control by using at least one of the relative speed between the host vehicle and the front vehicle, the relative distance between the host vehicle and the front vehicle, the acceleration of the front vehicle, or any combination thereof. When the predetermined basic deceleration is greater than the first required deceleration, the controller 130 may identify the average deceleration and instantaneous maximum deceleration of the rear vehicle by using at least one of the rear vehicle's average deceleration amount, instantaneous maximum deceleration amount, deceleration timing, or any combination thereof. The controller 130 may perform emergency stop control on the host vehicle based on a second required deceleration having a value smaller than the average deceleration. While performing the emergency stop control, the controller 130 may control the driving of the host vehicle by repeatedly and periodically using a third jerk deceleration having a value that is less than the instantaneous maximum deceleration and greater than the second required deceleration.

As described above, when the front vehicle and the rear vehicle are identified, the controller 130 may identify the first required deceleration for emergency stop control by using at least one of the relative speed between the host vehicle and the front vehicle, the relative distance between the host vehicle and the front vehicle, the acceleration of the front vehicle, or any combination thereof. When the first required deceleration is greater than the predetermined basic deceleration and less than the average deceleration of the rear vehicle, the controller 130 may perform emergency stop control on the host vehicle based on the predetermined basic deceleration. While performing the emergency stop control, the controller 130 may control the driving of the host vehicle by repeatedly and periodically using a fourth jerk deceleration having a value that is less than the instantaneous maximum deceleration of the rear vehicle and greater than the basic deceleration. Due to control through the fourth jerk deceleration, a sense of heterogeneity may be provided to the user. The user may thus perceive that the emergency stop control is being performed through the sense of heterogeneity.

As described above, when the front vehicle and the rear vehicle are identified, the controller 130 may identify the first required deceleration for emergency stop control by using at least one of the relative speed between the host vehicle and the front vehicle, the relative distance between the host vehicle and the front vehicle, the acceleration of the front vehicle, or any combination thereof. When the first required deceleration is greater than the predetermined basic deceleration and the instantaneous maximum deceleration of the rear vehicle, the controller 130 may identify a control time based on at least one of the relative distance between the host vehicle and the front vehicle, a relative speed between the host vehicle and the rear vehicle, a relative distance between the host vehicle and the rear vehicle, or any combination thereof. The controller 130 may perform emergency stop control during the identified control time based on the instantaneous maximum deceleration of the rear vehicle. While performing emergency stop control, the controller 130 may identify a fifth jerk deceleration based on the relative distance with the front vehicle and the instantaneous maximum deceleration and may control the driving of the host vehicle by repeatedly and periodically using the fifth jerk deceleration during a control time. Due to control through the fifth jerk deceleration, a sense of heterogeneity may be provided to the user. The user may thus perceive that the emergency stop control is being performed through the sense of heterogeneity. In an example, after the control time has elapsed (e.g., a time during which it is identified that dangerous situations may not occur due to the rear vehicle), the controller 130 may perform emergency stop control until the host vehicle stops by using the required deceleration calculated based on front vehicle driving information.

In response to identifying at least one other vehicle cutting into a driving lane of the host vehicle from at least one of the left lane, right lane, or any combination thereof, the controller 130 may perform emergency stop control on the host vehicle by using at least one of an average deceleration amount of the at least one other vehicle, an instantaneous maximum deceleration of the at least one other vehicle, a deceleration reaction speed of the at least one other vehicle, or any combination thereof.

The controller 130 may further identify vehicle model information of each of the front vehicle and rear vehicle by using the sensor device 110. The controller 130 may perform emergency stop control on the host vehicle based on the identified deceleration by further using vehicle model information.

Figure 2:
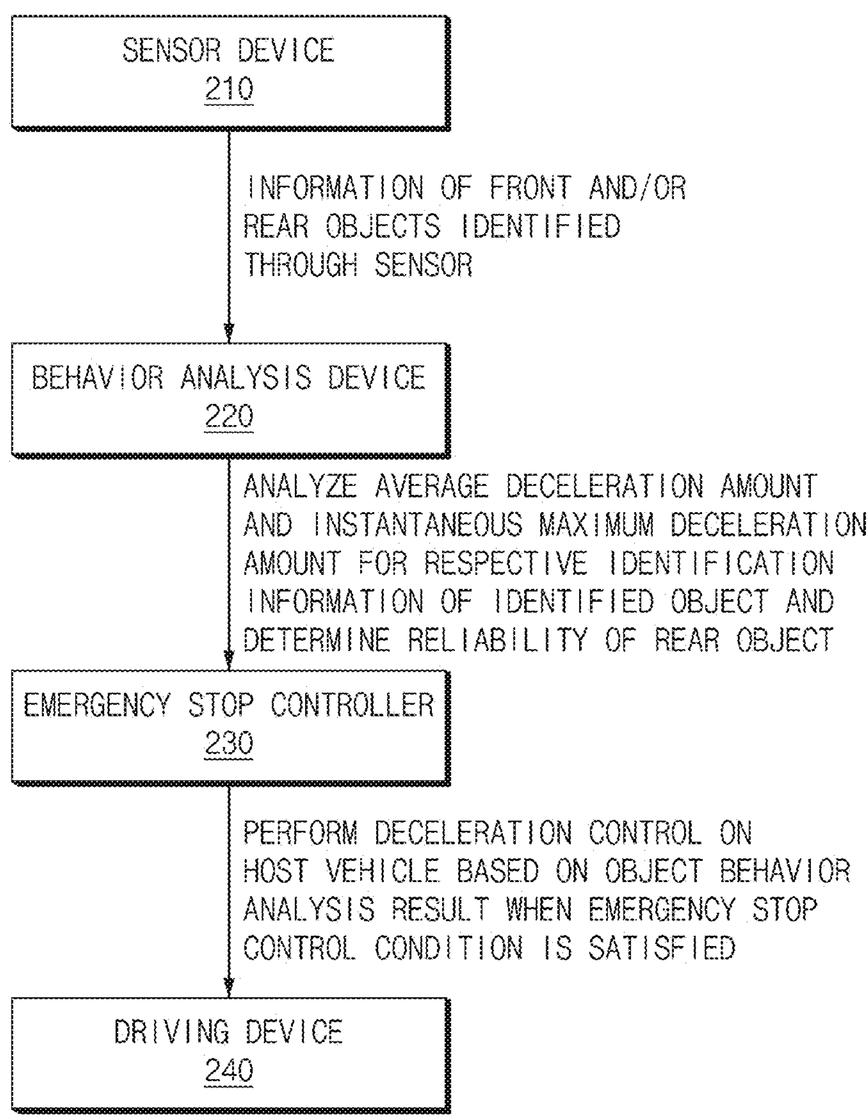
FIG. 2 is a conceptual diagram illustrating operation of an autonomous driving control apparatus, according to an embodiment of the present disclosure.

FIG. 2 is a block diagram showing components of an autonomous driving control apparatus, according to an embodiment of the present disclosure.

According to an embodiment, an autonomous driving control apparatus (e.g., the autonomous driving control apparatus 100 in FIG. 1) includes at least one of a sensor device 210 (e.g., corresponding to the sensor device 110 of FIG. 1), a behavior analysis device 220, an emergency stop controller 230, a driving device 240, or any combination thereof.

A structure of the components shown in FIG. 2 is an example, and embodiments of the present disclosure are not limited thereto. For example, at least a part (e.g., the behavior analysis device 220 and/or the emergency stop controller 230) of the components shown in FIG. 2 may be implemented as a part of the controller 130 and/or the sensor device 110 of FIG. 1 or may be implemented as a single chip together with the controller 130 and/or the sensor device 110. Generally, at least portions of operations of at least some components (e.g., the behavior analysis device 220 and/or the emergency stop controller 230) described in more detail below may be performed by the controller 130 and/or the sensor device 110 of FIG. 1 (or under control of the controller 130).

The sensor device 210 may identify information about a front object and/or rear object through at least one sensor and may provide at least a part of the identified information to the behavior analysis device 220.

For example, the sensor device 210 may identify the presence of a front vehicle that is driving in front of the host vehicle and/or a rear vehicle that is driving behind the host vehicle.

When it is identified that there is at least one other vehicle including the front vehicle and/or rear vehicle, the sensor device 210 may identify driving information of at least one other vehicle thus identified.

For example, the sensor device 210 may identify the relative distance and/or relative speed between the at least one other vehicle and the host vehicle. As another example, the sensor device 210 may identify the acceleration of the at least one other vehicle.

The behavior analysis device 220 may analyze (or identify) the average deceleration amount and instantaneous maximum deceleration amount for respective identification information of the identified object (e.g., the at least one other vehicle) by using at least at portion of the information identified through the sensor device 210. The behavior analysis device 220 and may determine (e.g., calculate) the reliability of information about a rear object (or a rear vehicle).

The behavior analysis device 220 may generate (or identify) identification information corresponding to at least one other vehicle. The behavior analysis device 220 may then analyze the average deceleration amount and/or instantaneous respective identification maximum deceleration amount for information.

The behavior analysis device 220 may identify the reliability of driving information (e.g., rear vehicle driving information) about the at least one other vehicle (e.g., a rear vehicle). The reliability may be identified based on at least one of a data acquisition cycle of the other vehicles vehicle driving information, a data acquisition period of the other vehicles vehicle driving information, a data accuracy of the other vehicles vehicle driving information, or any combination thereof.

The behavior analysis device 220 may provide the result of determining and identifying the at least one other vehicle to the emergency stop controller 230.

When an emergency stop control condition is satisfied, the emergency stop controller 230 may perform host vehicle deceleration control based on the object behavior analysis result identified through the behavior analysis device 220.

For example, when it is determined that a dangerous situation is likely to occur based on the state of at least one user (e.g., a driver) in the host vehicle, the emergency stop control may include driving control for reducing the driving speed of the host vehicle and stopping the host vehicle based on a specified deceleration.

The emergency stop controller 230 may identify the user's unresponsive state duration. When the unresponsive state duration is greater than or equal to a specified time duration, the emergency stop controller 230 may perform emergency stop control on the host vehicle by using at least a part of the other vehicle driving information identified through the behavior analysis device 220.

For example, the emergency stop controller 230 may identify the required deceleration and/or jerk deceleration for emergency stop control for the host vehicle based on the other vehicle driving information. The emergency stop controller 230 may identify the required deceleration and/or jerk deceleration for emergency stop control for the host vehicle further based on at least one of whether there is at least one other vehicle including a front vehicle and a rear vehicle, a relative speed between the at least one other vehicle and the host vehicle, a relative distance between the at least one other vehicle and the host vehicle, an acceleration of the at least one other vehicle, an average deceleration amount of the at least one other vehicle, an instantaneous maximum deceleration amount of the at least one other vehicle, a deceleration timing of the at least one other vehicle, an average deceleration of the at least one other vehicle, an instantaneous maximum deceleration of the at least one other vehicle, or any combination thereof. The emergency stop controller 230 may provide an indication of the required deceleration and/or jerk deceleration to the driving device 240.

In an embodiment, the emergency stop controller 230 may perform emergency stop control on the host vehicle based on information about at least one other vehicle as described above with reference to FIG. 1.

The driving device 240 may control the driving of the host vehicle by using the required deceleration and/or jerk deceleration identified through the emergency stop controller 230.

For example, the driving device 240 may control the driving of the host vehicle based on the required deceleration and/or jerk deceleration by using at least one driving device.

Figure 3:
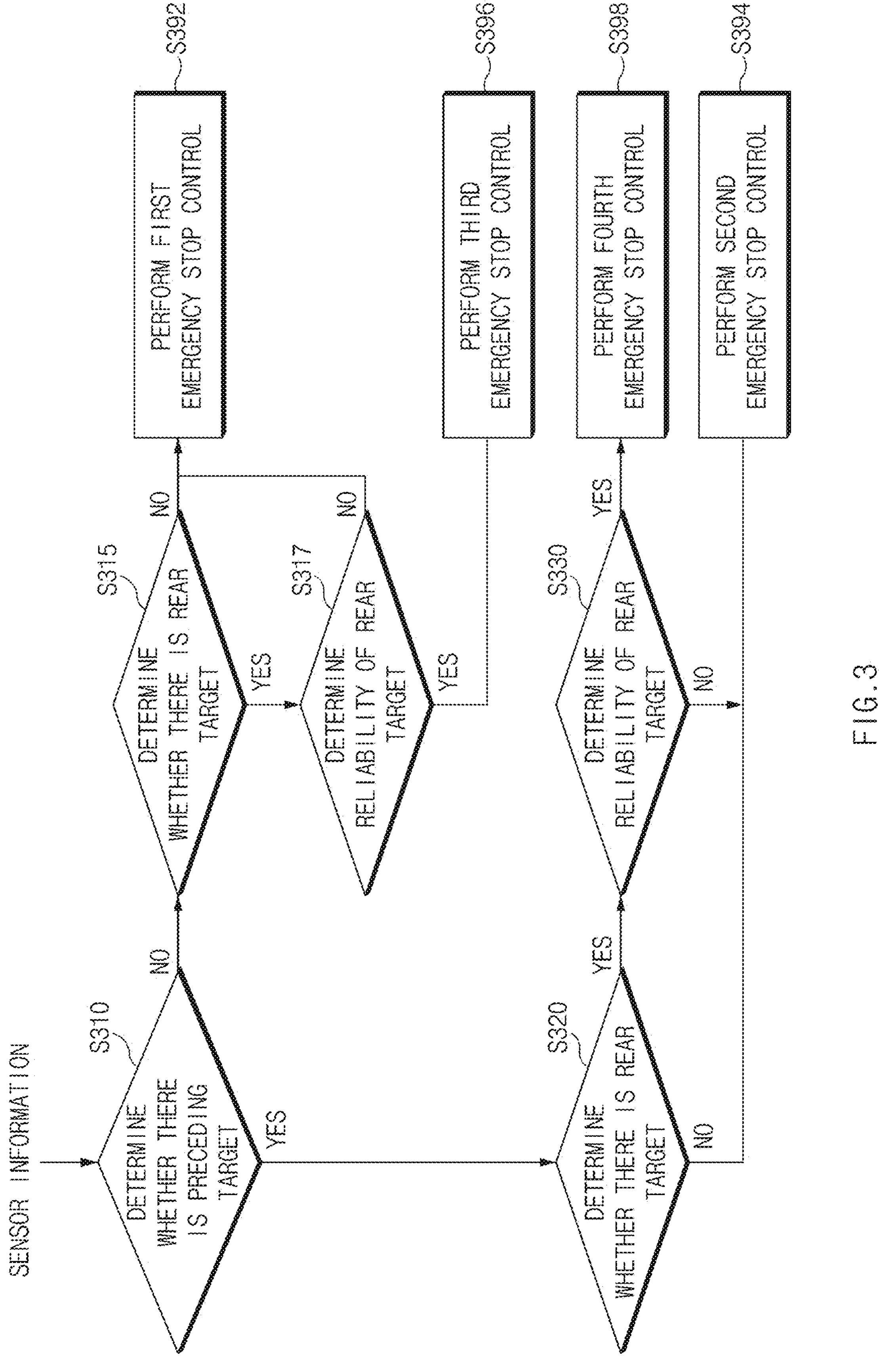
FIG. 3 is a flowchart of an autonomous driving control method, according to an embodiment of the present disclosure.

FIG. 3 is a flowchart of an autonomous driving control method, according to an embodiment of the present disclosure.

According to an embodiment, an autonomous driving control apparatus (e.g., the autonomous driving control apparatus of FIG. 1) may perform operations described in FIG. 3. For example, at least some components (e.g., the sensor device 110, the memory 120, and/or the controller 130 in FIG. 1) included in the autonomous driving control apparatus may be configured to perform operations of FIG. 3.

In an embodiment, operations S310-S398 may be performed sequentially as illustrated in FIG. 3, but the present disclosure is not so limited. For example, the order of operations may be changed and/or at least two operations may be performed in parallel. Descriptions corresponding to, or identical to, the above-mentioned descriptions may be briefly repeated with reference to FIG. 3 or may have been omitted from the description of FIG. 3, to avoid redundancy.

In an operation S310, the autonomous driving control apparatus may identify sensor information by using a sensor device and may determine whether there is a preceding target (e.g., a front vehicle) based on the sensor information.

For example, the autonomous driving control apparatus may determine whether there is a front vehicle that is driving in front of the host vehicle, from among at least one other vehicle driving adjacent to the host vehicle as identified by using the sensor device.

When it is determined that the preceding target (e.g., the front vehicle) is present (Yes in the operation S310), the autonomous driving control apparatus may perform operation S320.

On the other hand, when it is determined that the preceding target (e.g., the front vehicle) is not present (No in the operation S310), the autonomous driving control apparatus may perform operation S315.

In the operation S315, the autonomous driving control apparatus may determine whether there is a rear target (e.g., a rear vehicle) based on the sensor information.

For example, the autonomous driving control apparatus may determine whether there is a rear vehicle that is driving behind the host vehicle from among at least one other vehicle driving adjacent to the host vehicle as identified by using the sensor device.

When it is determined that the rear target (e.g., the rear vehicle) is present (Yes in the operation S315), the autonomous driving control apparatus may perform an operation S317.

On the other hand, when it is determined that the rear target (e.g., the rear vehicle) is not present (No in the operation S315), the autonomous driving control apparatus may perform operation S392.

In the operation S317, the autonomous driving control apparatus may determine reliability of the rear target. The autonomous driving control apparatus may further determine whether the reliability satisfies a specified condition.

For example, when it is determined that the reliability of the identified information about the rear target is greater than or equal to a specified value, the autonomous driving control apparatus may determine that the reliability satisfies the specified condition. The autonomous driving control apparatus may therefore determine that the corresponding information is available for driving control of the host vehicle.

When it is determined that the reliability of the rear target satisfies the specified condition (Yes in the operation S317), the autonomous driving control apparatus may perform operation S396.

On the other hand, when it is determined that the reliability of the rear target does not satisfy the specified condition (No in the operation S317), the autonomous driving control apparatus may perform operation S392.

In the operation S392, the autonomous driving control apparatus may perform first emergency stop control.

For example, when it is identified that both the preceding target and the rear target are not present, the autonomous driving control apparatus may perform the first emergency stop control on the host vehicle based on a predetermined basic deceleration. In this case, while performing the first emergency stop control, the autonomous driving control apparatus may control the driving of the host vehicle by repeatedly and periodically using a first jerk deceleration having a value that is greater than a basic deceleration.

In the operation S396, the autonomous driving control apparatus may perform third emergency stop control.

For example, when it is identified that the front target is not present and the rear target is present, the autonomous driving control apparatus may identify the average deceleration and instantaneous maximum deceleration of the rear target by using at least one of the rear target's average deceleration amount, instantaneous maximum deceleration amount, deceleration timing, or any combination thereof. In this case, the autonomous driving control apparatus may perform the third emergency stop control on the host vehicle based on a second required deceleration having a value smaller than the average deceleration. Moreover, while performing the third emergency stop control, the autonomous driving control apparatus may control the driving of the host vehicle by repeatedly and periodically using a third jerk deceleration having a value that is smaller than the instantaneous maximum deceleration and greater than the second required deceleration.

In the operation S320, the autonomous driving control apparatus may determine whether there is a rear target (e.g., a rear vehicle) based on sensor information.

For example, the autonomous driving control apparatus may determine whether there is a rear vehicle, that is driving behind the host vehicle, from among at least one other vehicle driving adjacent to the host vehicle as identified by using the sensor device.

When it is determined that the rear target (e.g., the rear vehicle) is present (Yes in the operation S320), the autonomous driving control apparatus may perform operation S330.

On the other hand, when it is determined that the rear target (e.g., the rear vehicle) is not present (No in the operation S320), the autonomous driving control apparatus may perform operation S394.

In the operation S330, the autonomous driving control apparatus may determine reliability of the rear target and may determine whether the reliability satisfies a specified condition.

For example, when it is determined that the reliability of the identified information about the rear target is greater than or equal to a specified value, the autonomous driving control apparatus may determine that the reliability satisfies the specified condition. The autonomous driving control apparatus may therefore determine that the corresponding information is available for driving control of the host vehicle.

When it is determined that the reliability of the rear target satisfies the specified condition (Yes in the operation S330), the autonomous driving control apparatus may perform operation S398.

On the other hand, when it is determined that the reliability of the rear target does not satisfy the specified condition (No in the operation S330), the autonomous driving control apparatus may perform operation S394.

In the operation S398, the autonomous driving control apparatus may perform fourth emergency stop control.

For example, when both the preceding target and the rear target are identified (e.g., when it is identified that both the preceding target and the rear target are present), the autonomous driving control apparatus may identify the first required deceleration for the fourth emergency stop control by using at least one of a relative speed between the host vehicle and the preceding target, a relative distance between the host vehicle and the preceding target, an acceleration of the preceding target, or any combination thereof.

When the predetermined basic deceleration is greater than the first required deceleration, the autonomous driving control apparatus may identify the average deceleration and instantaneous maximum deceleration of the rear vehicle by using at least one of the rear target's average deceleration amount, instantaneous maximum deceleration amount, deceleration timing, or any combination thereof. In this case, the autonomous driving control apparatus may perform the fourth emergency stop control on the host vehicle based on a second required deceleration having a value smaller than the average deceleration. Moreover, while performing the fourth emergency stop control, the autonomous driving control apparatus may control the driving of the host vehicle by repeatedly and periodically using a third jerk deceleration having a value that is smaller than the instantaneous maximum deceleration and greater than the second required deceleration.

When the first required deceleration is greater than the predetermined basic deceleration and less than the average deceleration of the rear target, the autonomous driving control apparatus may perform the fourth emergency stop control on the host vehicle based on the predetermined basic deceleration. Moreover, while performing the fourth emergency stop control, the autonomous driving control apparatus may control the driving of the host vehicle by repeatedly and periodically using a fourth jerk deceleration having value that is less than the instantaneous maximum deceleration of the rear target and greater than the basic deceleration.

When the first required deceleration is greater than the predetermined basic deceleration and the instantaneous maximum deceleration of the rear vehicle, the autonomous driving control apparatus may identify a control time based on at least one of a relative distance between the host vehicle and the preceding target, a relative speed between the host vehicle and the rear target, a relative distance between the host vehicle and the rear target, or any combination thereof. In this case, the autonomous driving control apparatus may perform the fourth emergency stop control during the control time based on the instantaneous maximum deceleration of the rear target. Furthermore, while performing the fourth emergency stop control based on the instantaneous maximum deceleration of the rear target, the autonomous driving control apparatus may identify a fifth jerk deceleration based on the relative distance from the preceding target and the instantaneous maximum deceleration of the rear target. The autonomous driving control apparatus may then control the driving of the host vehicle by repeatedly and periodically using the fifth jerk deceleration during the identified control time.

In the operation S394, the autonomous driving control apparatus may perform second emergency stop control.

When it is determined that the rear target is not present, or the reliability of the identified information about the rear target does not satisfy a specified condition, the autonomous driving control apparatus may perform the second emergency stop control based on the driving information of the preceding target.

When it is identified that the preceding target is present and the rear target is not present, or when the preceding target is present and the reliability of information about the rear target does not satisfy the specified criterion, the autonomous driving control apparatus may identify a first required deceleration for the second emergency stop control by using at least one of a relative speed between the host vehicle and the front vehicle, a relative distance between the host vehicle and the front vehicle, an acceleration of the front vehicle, or any combination thereof. In this case, the autonomous driving control apparatus may perform the second emergency stop control on the host vehicle based on the smaller value of the predetermined basic deceleration and the first required deceleration. Further, while performing the second emergency stop control, the autonomous driving control apparatus may control the driving of the host vehicle by repeatedly and periodically using a second jerk deceleration having a value greater than the smaller value between basic deceleration and first required deceleration.

Figure 4:
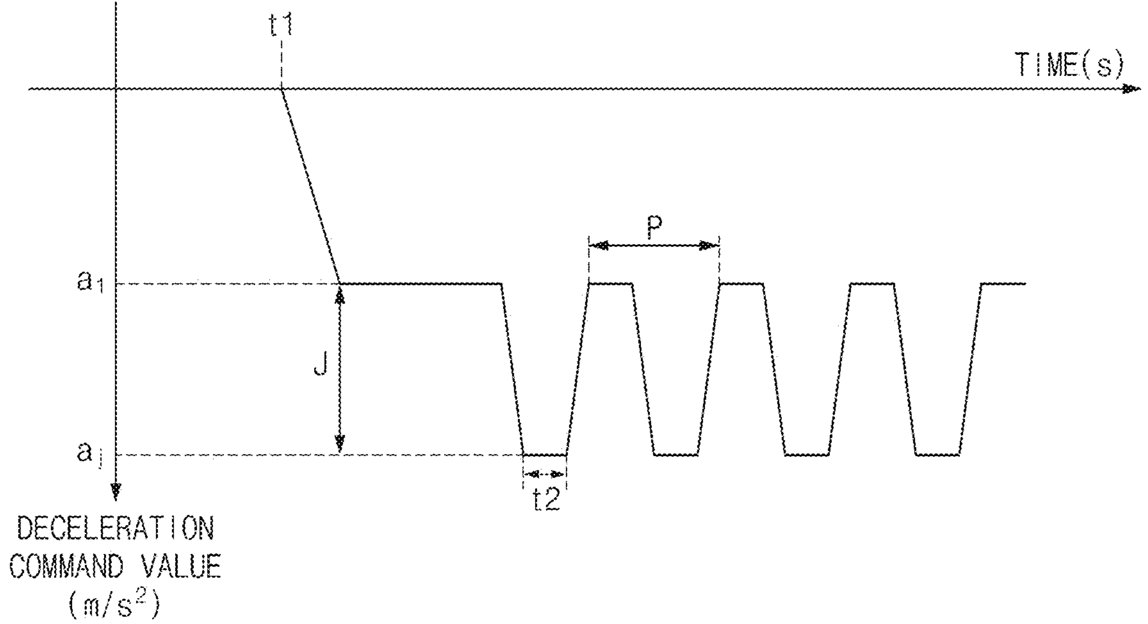
FIG. 4 is a diagram illustrating a deceleration used when an autonomous driving control apparatus performs emergency stop control, according to an embodiment of the present disclosure.

FIG. 4 is a diagram illustrating a deceleration used when an autonomous driving control apparatus performs emergency stop control, according to an embodiment of the present disclosure.

Referring to FIG. 4, according to an embodiment, an autonomous driving control apparatus (e.g., the autonomous driving control apparatus 100 in FIG. 1) may identify a required deceleration for emergency stop control for a host vehicle.

At a first time point t1, the autonomous driving control apparatus may identify that a condition for emergency stop control is satisfied.

For example, the autonomous driving control apparatus may identify that a user's unresponsive state duration is maintained such that the unresponsive state duration is greater than or equal to a specified time, and may activate the emergency stop control.

In embodiments of the present disclosure, a condition for activating emergency stop control may be related to the user's unresponsive state duration, but the embodiments of the present disclosure are not limited thereto. For example, the condition for activating emergency stop control may be provided based on at least one of the host vehicle's driving information, driving performance, information of components for driving, surrounding situations, or any combination thereof.

The autonomous driving control apparatus may activate emergency stop control for the host vehicle at the first time point t1, and may perform deceleration control on the host vehicle based on a required deceleration $a_1$.

The required deceleration $a_1$ may be calculated by the emergency stop control method identified in the description of FIG. 3, for example.

The autonomous driving control apparatus may perform deceleration control on the host vehicle until a real-time deceleration of the host vehicle becomes the required deceleration $a_1$ based on a specified deceleration slope from the first time point t1.

While performing emergency stop control on the host vehicle based on the required deceleration $a_1$, the autonomous driving control apparatus may control the driving of the host vehicle by repeatedly using a jerk deceleration $a_j$ identified based on a specified criterion based on a specified cycle 'p' (or applying it to the driving device). The usage time (or authorization time) of the jerk deceleration $a_j$ may be a predetermined time (e.g., a second time t2).

For example, the absolute value of the jerk deceleration $a_j$ may be greater than the absolute value of required deceleration $a_1$ by a predetermined amount 'J'.

While performing emergency stop control on the host vehicle based on the required deceleration $a_1$, the autonomous driving control apparatus may perform deceleration control of the host vehicle until the real-time deceleration of the host vehicle becomes the jerk deceleration $a_j$ based on a predefined jerk deceleration slope.

Figure 5:
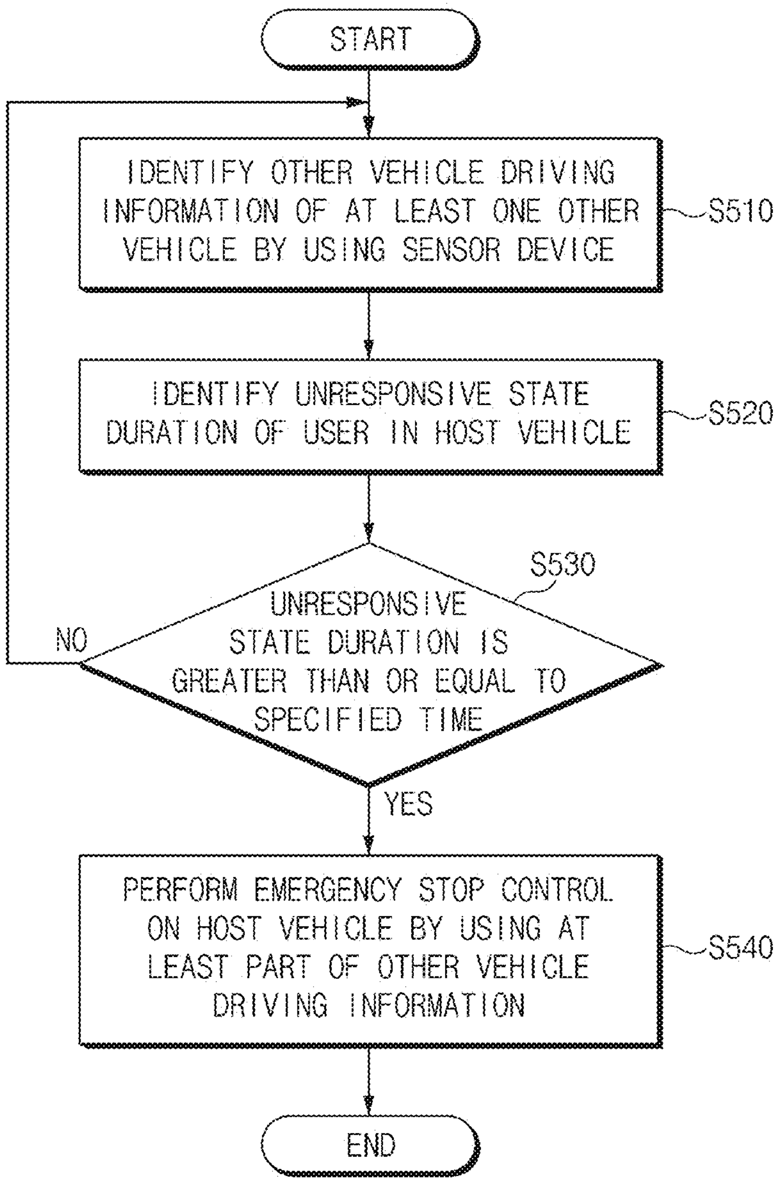
FIG. 5 is a flowchart of an autonomous driving control method, according to an embodiment of the present disclosure.

FIG. 5 is a flowchart of an autonomous driving control method, according to an embodiment of the present disclosure.

According to an embodiment, an autonomous driving control apparatus (e.g., the autonomous driving control apparatus of FIG. 1) may perform operations S510-S540 described in FIG. 5. For example, at least some components (e.g., the sensor device 110, the memory 120, and/or the controller 130 in FIG. 1) included in the autonomous driving control apparatus may be configured to perform operations of FIG. 5.

In an embodiment, the operations S510-S540 may be performed sequentially, but the present disclosure is not so limited. For example, the order of operations may be changed and/or at least two operations may be performed in parallel. Descriptions corresponding to, or identical to, the above-mentioned descriptions may be briefly repeated with reference to FIG. 5 or may have been omitted from the description of FIG. 5, to avoid redundancy.

In an operation S510, the autonomous driving control apparatus may identify other vehicle driving information of at least one other vehicle by using a sensor device.

For example, the autonomous driving control apparatus may identify driving information of at least one other vehicle that is driving adjacent to the host vehicle.

For example, when there is a front vehicle that is driving in front of the host vehicle, the autonomous driving control apparatus may identify front vehicle driving information including at least one of a relative speed between the host vehicle and the front vehicle, a relative distance between the host vehicle and the front vehicle, an acceleration of the front vehicle, or any combination thereof.

As another example, when there is a rear vehicle driving behind the host vehicle, the autonomous driving control apparatus may identify rear vehicle driving information including at least one of the rear vehicle's average deceleration amount, instantaneous maximum deceleration amount, deceleration timing, or any combination thereof. The autonomous driving control apparatus may further identify at least one of the rear vehicle's average deceleration, instantaneous maximum deceleration, or any combination thereof based on the identified information.

The autonomous driving control apparatus may identify the reliability of at least a part of the other vehicle driving information thus identified. When the reliability satisfies a specified criterion (e.g., the reliability is greater than or equal to a reference value), the autonomous driving control apparatus may use only information corresponding to the corresponding reliability to control the host vehicle.

In an operation S520, the autonomous driving control apparatus may identify unresponsive state duration of a user in the host vehicle).

For example, the user's unresponsive state may include a hands-off state (e.g., a state where the user does not grip a steering wheel) of the host vehicle and/or a state where a direction in which the user faces is not included in a specified direction while the host vehicle is controlled based on a specified control algorithm.

In an operation S530, the autonomous driving control apparatus may determine whether the unresponsive state duration is greater than or equal to a specified time duration.

For example, the autonomous driving control apparatus may determine whether the hands-off state of the host vehicle is identified for a first time duration or longer.

As another example, while controlling the host vehicle based on ICC, the autonomous driving control apparatus may determine whether a direction in which a user faces as identified by using a sensor device is not included in the specified direction for a second time duration or longer.

When the unresponsive state duration is greater than or equal to the specified time duration (Yes in the operation S530), the autonomous driving control apparatus may perform operation S540.

When the unresponsive state duration is less than the specified time duration (No in the operation S530), the autonomous driving control apparatus may return to the operation S510.

In the operation S540, the autonomous driving control apparatus may perform emergency stop control on the host vehicle by using at least a part of other vehicle driving information.

For example, the autonomous driving control apparatus may calculate a required deceleration and a jerk deceleration for emergency stop control in different methods depending on whether there is a front vehicle or rear vehicle.

For example, the autonomous driving control apparatus may calculate the required deceleration and the jerk deceleration based on at least one of a relative speed between at least one other vehicle and the host vehicle, a relative distance between the at least one other vehicle and the host vehicle, an acceleration of the at least one other vehicle, an average deceleration amount of the at least one other vehicle, an instantaneous maximum deceleration amount of the at least one other vehicle, a deceleration timing of the at least one other vehicle, or any combination thereof.

The autonomous driving control apparatus may perform emergency stop control on the host vehicle based on the required deceleration and the jerk deceleration, which are calculated. In an embodiment, the autonomous driving control apparatus may perform the emergency stop control as described above with reference to FIG. 3.

Figure 6:
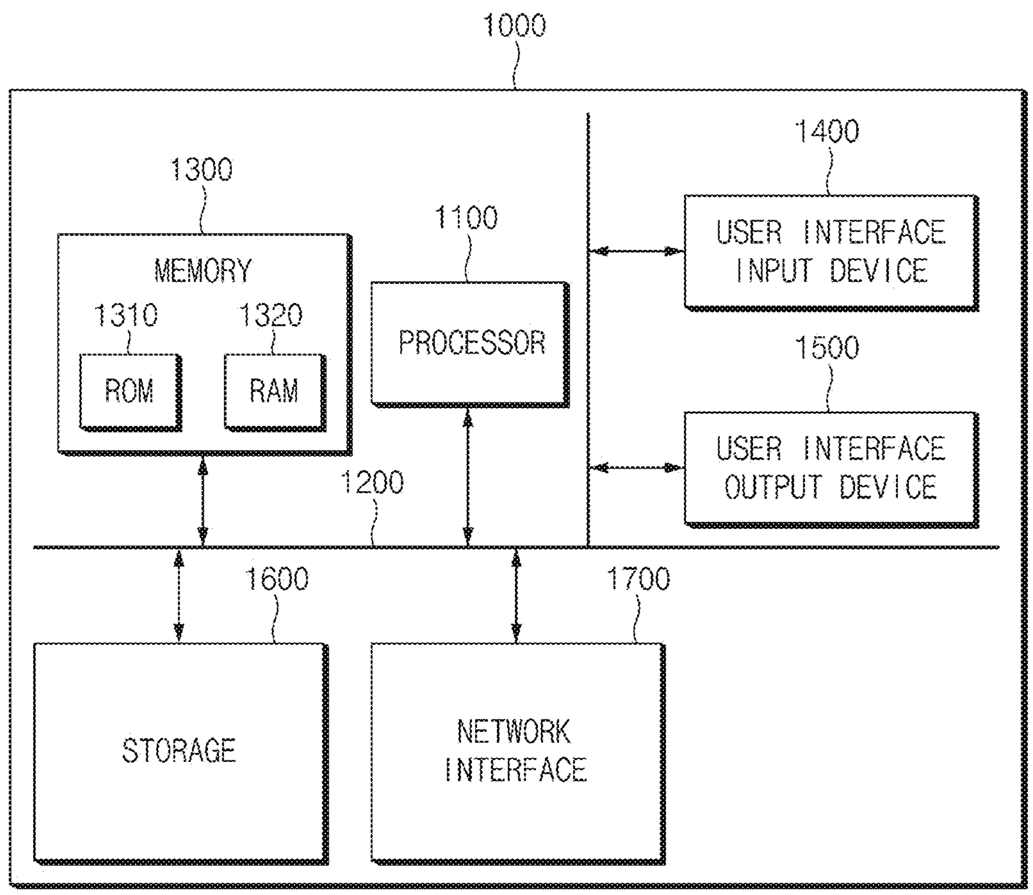
FIG. 6 illustrates a computing system related to an autonomous driving control method, according to an embodiment of the present disclosure.

FIG. 6 illustrates a computing system configured to perform an autonomous driving control method, according to an embodiment of the present disclosure.

Referring to FIG. 6, a computing system 1000 configured to perform an autonomous driving control method may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the embodiments of the present disclosure may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. Alternatively, the storage medium may be integrated with the processor 1100. The processor 1100 may read out information from the storage medium and may write information in the storage medium. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure. Various modifications and variations may be made by one having ordinary skill in the art to which the present disclosure pertains without departing from the essential characteristics of the present disclosure.

Accordingly, embodiments of the present disclosure are intended not to limit but to explain the technical idea of the present disclosure. The scope and spirit of the present disclosure is not limited by the above embodiments. The scope of protection of the present disclosure should be construed by the attached claims and all equivalents thereof should be construed as being included within the scope of the present disclosure.

Descriptions of an autonomous driving control apparatus according to an embodiment of the present disclosure, and a method thereof are as follows.

According to at least one embodiment of the present disclosure, an autonomous driving control apparatus may adaptively identify deceleration by using behavioral states of a front vehicle and/or a rear vehicle (e.g., at least one of a relative speed between a host vehicle and the front vehicle and/or the rear vehicle, a relative distance between the host vehicle and the front vehicle and/or the rear vehicle, an acceleration of the front vehicle and/or the rear vehicle, an average deceleration amount of the front vehicle and/or the rear vehicle, an instantaneous maximum deceleration amount of the front vehicle and/or the rear vehicle, a deceleration timing of the front vehicle and/or the rear vehicle, or any combination thereof) to perform emergency stop control on a host vehicle.

According to at least one embodiment of the present disclosure, to calculate a deceleration, an autonomous driving control apparatus may use information from other vehicles (e.g., the front vehicle and/or the rear vehicle) that are likely to collide with the host vehicle, thereby reducing the risk of collision due to an emergency stop.

According to at least one embodiment of the present disclosure, an autonomous driving control apparatus may perform emergency stop control when a user's unresponsive state duration exceeds (or is greater than or equal to) a specified time duration. In this case, the autonomous driving control apparatus may calculate a deceleration through different adaptive algorithms based on whether there is another vehicle that may collide with the host vehicle, thereby enhancing usability.

A variety of effects may be directly or indirectly understood by those having ordinary skill in the art to which the present disclosure pertains from the above description.

Hereinabove, although the present disclosure has been described with reference to embodiments and the accompanying drawings, the present disclosure is not limited thereto. Rather, the present disclosure may be variously modified and altered by those having ordinary skill in the art to which the present disclosure pertains without departing from the spirit and scope of the present disclosure claimed in the following claims.

What is claimed is:

1. An apparatus for controlling autonomous driving of a host vehicle, the apparatus comprising:

a sensor device;

a memory configured to store instructions; and a controller operatively connected to the sensor device and the memory, wherein the instructions, when executed by the controller, cause the controller to identify other vehicle driving information including at least one of a relative speed between the host vehicle and a front vehicle, a relative distance between the host vehicle and the front vehicle, an acceleration of the front vehicle, an average deceleration amount of a rear vehicle driving behind the host vehicle, an instantaneous maximum deceleration amount of the rear vehicle, a deceleration timing of the rear vehicle, or a combination thereof, wherein:

the front vehicle is a vehicle driving in front of the host vehicle and the rear vehicle is a vehicle driving behind the host vehicle, and the instructions, when executed by the controller, cause the controller to identify front vehicle driving information including at least one of the relative speed between the host vehicle and the front vehicle, the relative distance between the host vehicle and the front vehicle, the acceleration of the front vehicle, or a combination thereof, and identify rear vehicle driving information including at least one of the average deceleration amount of the rear vehicle, the instantaneous maximum deceleration amount of the rear vehicle, the deceleration timing of the rear vehicle, or a combination thereof, identify unresponsive state duration of a user within the host vehicle, and when the unresponsive state duration is greater than or equal to a specified time duration, perform emergency stop control on the host vehicle by using at least a part of the other vehicle driving information, wherein the instructions, when executed by the controller, further cause the controller to:

identify first identification information corresponding to the rear vehicle, in response to identifying that the first identification information is changed to second identification information corresponding to another vehicle different from the rear vehicle, apply aging to reliability of the rear vehicle driving information obtained until a point in time when the first identification information is changed, and when the first identification information is identified again before the reliability is reduced based on the aging such that the reliability is smaller than or equal to a specified value, perform the emergency stop control by using the rear vehicle driving information obtained until the point in time.

2. The apparatus of claim 1, wherein the instructions, when executed by the controller, cause the controller to:

when the unresponsive state duration is greater than or equal to the specified time duration, perform the emergency stop control by using the front vehicle driving information and the rear vehicle driving information.

3. The apparatus of claim 2, wherein the instructions, when executed by the controller, cause the controller to:

when the first identification information is identified again after the reliability is reduced based on the aging such that the reliability is smaller than or equal to the specified value, identify further information about the rear vehicle, the further information having a specified amount determined based on a level of reliability; and when the further information about the rear vehicle satisfies a specified condition, perform the emergency stop control by using the further information about the rear vehicle.

4. The apparatus of claim 1, wherein the instructions, when executed by the controller, cause the controller to:

perform the emergency stop control on the host vehicle when one or both of i) a hands-off state of the host vehicle is identified for a first time duration or longer or ii) a direction in which the user faces as identified by using the sensor device is not included in a specified direction for a second time duration or longer while the host vehicle is controlled based on an in-cabin-camera (ICC).

5. The apparatus of claim 1, wherein the instructions, when executed by the controller, cause the controller to:

when it is identified that both the front vehicle and the rear vehicle are not present, perform the emergency stop control on the host vehicle based on a predetermined basic deceleration; and while performing the emergency stop control, control driving of the host vehicle by repeatedly and periodically using a first jerk deceleration having a value that is greater than the predetermined basic deceleration.

6. The apparatus of claim 1, wherein the instructions, when executed by the controller, cause the controller to:

when it is identified that the front vehicle is present and the rear vehicle is not present, identify a first required deceleration for the emergency stop control by using at least one of the relative speed between the host vehicle and the front vehicle, the relative distance between the host vehicle and the front vehicle, the acceleration of the front vehicle, or a combination thereof;

perform the emergency stop control on the host vehicle based on a smaller value of a predetermined basic deceleration and the first required deceleration; and while performing the emergency stop control, control driving of the host vehicle by repeatedly and periodically using a second jerk deceleration having a value that is greater than the smaller value.

7. The apparatus of claim 1, wherein the instructions, when executed by the controller, cause the controller to:

when it is identified that the front vehicle is not present and the rear vehicle is present, identify an average deceleration of the rear vehicle and an instantaneous maximum deceleration of the rear vehicle by using at least one of the average deceleration amount of the rear vehicle, the instantaneous maximum deceleration amount of the rear vehicle, the deceleration timing of the rear vehicle, or a combination thereof;

perform the emergency stop control on the host vehicle based on a second required deceleration having a value smaller than the average deceleration; and while performing the emergency stop control, control driving of the host vehicle by repeatedly and periodically using a third jerk deceleration having a value that is less than the instantaneous maximum deceleration and greater than the second required deceleration.

8. The apparatus of claim 1, wherein the instructions, when executed by the controller, cause the controller to:

when both the front vehicle and the rear vehicle are identified, identify a first required deceleration for the emergency stop control by using at least one of the relative speed between the host vehicle and the front vehicle, the relative distance between the host vehicle and the front vehicle, the acceleration of the front vehicle, or a combination thereof;

identify an average deceleration of the rear vehicle and an instantaneous maximum deceleration of the rear vehicle by using at least one of the average deceleration amount of the rear vehicle, the instantaneous maximum deceleration amount of the rear vehicle, the deceleration timing of the rear vehicle, or a combination thereof;

perform the emergency stop control on the host vehicle based on a second required deceleration having a value smaller than the average deceleration; and while performing the emergency stop control, control driving of the host vehicle by repeatedly and periodically using a third jerk deceleration having a value that is less than the instantaneous maximum deceleration and greater than the second required deceleration.

9. The apparatus of claim 1, wherein the instructions, when executed by the controller, cause the controller to:

when both the front vehicle and the rear vehicle are identified, identify a first required deceleration for the emergency stop control by using at least one of the relative speed between the host vehicle and the front vehicle, the relative distance between the host vehicle and the front vehicle, the acceleration of the front vehicle, or a combination thereof;

when the first required deceleration is greater than a predetermined basic deceleration and less than an average deceleration of the rear vehicle, perform the emergency stop control on the host vehicle based on the predetermined basic deceleration; and while performing the emergency stop control, control driving of the host vehicle by repeatedly and periodically using a fourth jerk deceleration having a value that is less than an instantaneous maximum deceleration of the rear vehicle and greater than the predetermined basic deceleration.

10. The apparatus of claim 1, wherein the instructions, when executed by the controller, cause the controller to:

when both the front vehicle and the rear vehicle are identified, identify a first required deceleration for the emergency stop control by using at least one of the relative speed between the host vehicle and the front vehicle, the relative distance between the host vehicle and the front vehicle, the acceleration of the front vehicle, or a combination thereof;

when the first required deceleration is greater than a predetermined basic deceleration and an instantaneous maximum deceleration of the rear vehicle, identify a control time based on at least one of the relative distance between the host vehicle and the front vehicle, the relative speed between the host vehicle and the front vehicle, a relative distance between the host vehicle and the rear vehicle, or a combination thereof; and perform the emergency stop control during the control time based on the instantaneous maximum deceleration of the rear vehicle.

11. The apparatus of claim 10, wherein the instructions, when executed by the controller, cause the controller to:

identify a fifth jerk deceleration based on the relative distance between the host vehicle and the front vehicle and the instantaneous maximum deceleration; and while performing the emergency stop control, control driving of the host vehicle by repeatedly and periodically using the fifth jerk deceleration during the control time.

12. The apparatus of claim 1, wherein the instructions, when executed by the controller, cause the controller to:

in response to identifying at least one other vehicle cutting into a driving lane of the host vehicle from at least one of a left lane that is to the left of the driving lane of the host vehicle, a right lane that is to the right of the driving lane, or a combination thereof, perform the emergency stop control on the host vehicle by using at least one of an average deceleration amount of the at least one other vehicle, an instantaneous maximum deceleration of the at least one other vehicle, a deceleration reaction speed of the at least one other vehicle, or a combination of the average deceleration amount of the at least one other vehicle, the instantaneous maximum deceleration of the at least one other vehicle, the deceleration reaction speed of the at least one other vehicle, or a combination thereof.

13. The apparatus of claim 1, wherein the instructions, when executed by the controller, cause the controller to:

further identify vehicle model information of one or both of the front vehicle and the rear vehicle by using the sensor device; and perform the emergency stop control on the host vehicle based on a deceleration identified by further using the vehicle model information.

14. A method for autonomous driving control of a host vehicle, the method comprising:

identifying, by a controller using a sensor device, other vehicle driving information including at least one of a relative speed between the host vehicle and a front vehicle, a relative distance between the host vehicle and the front vehicle, an acceleration of the front vehicle, an average deceleration amount of a rear vehicle of the host vehicle, an instantaneous maximum deceleration amount of the rear vehicle, a deceleration timing of the rear vehicle, or a combination thereof, wherein the front vehicle is a vehicle driving in front of the host vehicle and the rear vehicle is a vehicle driving behind the host vehicle, wherein identifying the other vehicle driving information includes:

identifying front vehicle driving information including at least one of the relative speed between the host vehicle and the front vehicle, the relative distance between the host vehicle and the front vehicle, the acceleration of the front vehicle, or a combination thereof, and identifying rear vehicle driving information including at least one of the average deceleration amount of the rear vehicle, the instantaneous maximum deceleration amount of the rear vehicle, the deceleration timing of the rear vehicle, or a combination thereof;

identifying, by the controller, unresponsive state duration of a user within the host vehicle; and when the unresponsive state duration is greater than or equal to a specified time duration, performing, by the controller, emergency stop control on the host vehicle by using at least a part of the other vehicle driving information, wherein the method further comprises:

identifying first identification information corresponding to the rear vehicle, in response to identifying that the first identification information is changed to second identification information corresponding to another vehicle different from the rear vehicle, applying aging to reliability of the rear vehicle driving information obtained until a point in time when the first identification information is changed, and when the first identification information is identified again before the reliability is reduced based on the aging such that the reliability is smaller than or equal to a specified value, performing the emergency stop control by using the rear vehicle driving information obtained until the point in time.

15. The method of claim 14, wherein performing the emergency stop control on the host vehicle includes:

performing, by the controller, the emergency stop control on the host vehicle when one or both of i) a hands-off state of the host vehicle is identified for a first time duration or longer or ii) a direction in which the user faces as identified by using the sensor device is not included in a specified direction for a second time or longer while the host vehicle is controlled based on an ICC.

16. The method of claim 14, further comprising:

when it is identified that both the front vehicle and the rear vehicle are not present, performing, by the controller, the emergency stop control on the host vehicle based on a predetermined basic deceleration; and while performing the emergency stop control, controlling, by the controller, driving of the host vehicle by repeatedly and periodically using a first jerk deceleration having a value that is greater than the predetermined basic deceleration.

17. The method of claim 14, further comprising:

when it is identified that the front vehicle is present and the rear vehicle is not present, identifying, by the controller, a first required deceleration for the emergency stop control by using at least one of the relative speed between the host vehicle and the front vehicle, the relative distance between the host vehicle and the front vehicle, the acceleration of the front vehicle, or a combination of the relative speed, the relative distance, the acceleration, or a combination thereof;

performing, by the controller, the emergency stop control on the host vehicle based on a smaller value of a predetermined basic deceleration and the first required deceleration; and while performing the emergency stop control, controlling, by the controller, driving of the host vehicle by repeatedly and periodically using a second jerk deceleration having a value that is greater than the smaller value.

18. The method of claim 14, further comprising:

when it is identified that the front vehicle is not present and the rear vehicle is present, identifying, by the controller, an average deceleration of the rear vehicle and an instantaneous maximum deceleration of the rear vehicle by using at least one of the average deceleration amount of the rear vehicle, the instantaneous maximum deceleration amount of the rear vehicle, the deceleration timing of the rear vehicle, or a combination thereof;

performing, by the controller, the emergency stop control on the host vehicle based on a second required deceleration having a value smaller than the average deceleration; and while performing the emergency stop control, controlling, by the controller, driving of the host vehicle by repeatedly and periodically using a third jerk deceleration having a value that is less than the instantaneous maximum deceleration and greater than the second required deceleration.

19. The method of claim 14, further comprising:

when both the front vehicle and the rear vehicle are identified, identifying, by the controller, a first required deceleration for the emergency stop control by using at least one of the relative speed between the host vehicle and the front vehicle, the relative distance between the host vehicle and the front vehicle, the acceleration of the front vehicle, or a combination thereof;

identifying, by the controller, an average deceleration of the rear vehicle and an instantaneous maximum deceleration of the rear vehicle by using at least one of the average deceleration amount of the rear vehicle, the instantaneous maximum deceleration amount of the rear vehicle, the deceleration timing of the rear vehicle, or a combination thereof;

performing, by the controller, the emergency stop control on the host vehicle based on a second required deceleration having a value smaller than the average deceleration; and while performing the emergency stop control, controlling, by the controller, driving of the host vehicle by repeatedly and periodically using a third jerk deceleration having a value that is less than the instantaneous maximum deceleration and greater than the second required deceleration.

* * * * *